United States Patent
Shanabrook et al.

(10) Patent No.: US 9,530,015 B2
(45) Date of Patent: Dec. 27, 2016

(54) SYSTEM, METHOD AND COMPUTER PROGRAM PRODUCT FOR MESSAGING IN AN ON-DEMAND DATABASE SERVICE

(71) Applicant: salesforce.com, inc, San Francisco, CA (US)

(72) Inventors: Susan Carol Shanabrook, Safety Harbor, FL (US); Richard Alan Stevens, Odessa, FL (US); Ron H. Kimble, Lutz, FL (US); Michael P. Cadden, Lutz, FL (US); Travis D. Corson, Tampa, FL (US)

(73) Assignee: salesforce.com, inc., San Francisco, CA (US)

( * ) Notice: Subject to any disclaimer, the term of this patent is extended or adjusted under 35 U.S.C. 154(b) by 809 days.

(21) Appl. No.: 13/797,798

(22) Filed: Mar. 12, 2013

(65) Prior Publication Data
US 2013/0198869 A1 Aug. 1, 2013

Related U.S. Application Data

(63) Continuation of application No. 12/175,082, filed on Jul. 17, 2008, now Pat. No. 8,781,988.
(Continued)

(51) Int. Cl.
*G06F 17/00* (2006.01)
*G06N 5/02* (2006.01)
(Continued)

(52) U.S. Cl.
CPC ............ *G06F 21/606* (2013.01); *H04L 51/12* (2013.01); *H04L 51/28* (2013.01); *G06N 5/022* (2013.01);
(Continued)

(58) Field of Classification Search
None
See application file for complete search history.

(56) References Cited

U.S. PATENT DOCUMENTS 1,735,116 A * 11/1929 Jones ............... H02P 11/00
307/58
5,577,188 A 11/1996 Zhu
(Continued)

FOREIGN PATENT DOCUMENTS

EP 1826979 8/2007

OTHER PUBLICATIONS

Non-Final Office Action from U.S. Appl. No. 13/797,828, dated Sep. 12, 2014.
(Continued)

*Primary Examiner* — Kakali Chaki
*Assistant Examiner* — Ababacar Seck
(74) *Attorney, Agent, or Firm* — Meyertons, Hood, Kivlin, Kowert & Goetzel, P.C.

(57) ABSTRACT

In accordance with embodiments, there are provided mechanisms and methods for messaging in an on-demand database service. These mechanisms and methods for messaging in an on-demand database service can enable embodiments to more flexibly message in on-demand database environments. The ability of embodiments to provide such feature may lead to enhanced messaging features which may be used for providing more effective ways of messaging in the context of on-demand databases.

20 Claims, 11 Drawing Sheets

Related U.S. Application Data

(60) Provisional application No. 60/950,831, filed on Jul. 19, 2007.

(51) Int. Cl.
*G06F 21/60* (2013.01)
*H04L 12/58* (2006.01)
*G06N 5/04* (2006.01)
*G06Q 10/10* (2012.01)
*G06Q 10/06* (2012.01)

(52) U.S. Cl.
CPC .............. *G06N 5/025* (2013.01); *G06N 5/04* (2013.01); *G06Q 10/06* (2013.01); *G06Q 10/10* (2013.01)

(56) References Cited

U.S. PATENT DOCUMENTS

| | | |
|---|---|---|
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,092,197 A | 7/2000 | Coueignoux |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,181,758 B1 | 2/2007 | Chan |
| 7,209,929 B2 | 4/2007 | Dominguez, Jr. et al. |
| 7,289,976 B2 | 10/2007 | Kihneman et al. |
| 7,309,619 B2 | 12/2007 | Hasegawa et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,562,119 B2 | 7/2009 | Smith et al. |
| 7,620,655 B2 | 11/2009 | Larsson et al. |
| 7,698,160 B2 | 4/2010 | Beaven et al. |
| 7,779,039 B2 | 8/2010 | Weissman et al. |
| 8,015,495 B2 | 9/2011 | Achacoso et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 8,457,545 B2 | 6/2013 | Chan |
| 8,484,111 B2 | 7/2013 | Frankland et al. |
| 8,677,470 B1 | 3/2014 | Cadden et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2002/0181703 A1* | 12/2002 | Logan .................. G06Q 20/382 380/30 |
| 2003/0004971 A1 | 1/2003 | Gong et al. |
| 2003/0009698 A1 | 1/2003 | Lindeman et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0115280 A1* | 6/2003 | Quine .................. H04L 29/1215 709/207 |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2003/0229668 A1 | 12/2003 | Malik |
| 2003/0233404 A1 | 12/2003 | Hopkins |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0054887 A1* | 3/2004 | Paulsen, Jr. ......... H04L 63/0428 713/154 |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |

(56) References Cited

U.S. PATENT DOCUMENTS

| | | |
|---|---|---|
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0065925 A1 | 3/2005 | Weissman et al. |
| 2005/0091098 A1 | 4/2005 | Brodersen et al. |
| 2005/0114548 A1 | 5/2005 | Tucciarone et al. |
| 2005/0132060 A1 | 6/2005 | Mo et al. |
| 2005/0223022 A1 | 10/2005 | Weissman et al. |
| 2005/0283478 A1 | 12/2005 | Choi et al. |
| 2006/0021019 A1 | 1/2006 | Hinton et al. |
| 2006/0036546 A1 | 2/2006 | Arcieri et al. |
| 2006/0206834 A1 | 9/2006 | Fisher et al. |
| 2007/0005716 A1* | 1/2007 | LeVasseur .......... H04L 63/306 709/206 |
| 2007/0107059 A1* | 5/2007 | Chasin ............... H04L 63/126 726/23 |
| 2007/0156895 A1 | 7/2007 | Vuong |
| 2008/0005786 A1 | 1/2008 | Dreymann |
| 2008/0008095 A1 | 1/2008 | Gilfix |
| 2008/0086514 A1 | 4/2008 | Weissman et al. |
| 2008/0104187 A1 | 5/2008 | Wilson et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2009/0262741 A1 | 10/2009 | Jungck et al. |
| 2011/0271349 A1 | 11/2011 | Kaplan |
| 2013/0191892 A1 | 7/2013 | Cadden et al. |
| 2013/0198869 A1 | 8/2013 | Shanabrook et al. |
| 2013/0198870 A1 | 8/2013 | Shanabrook et al. |
| 2013/0198871 A1 | 8/2013 | Shanabrook et al. |
| 2013/0218948 A1 | 8/2013 | Jakobson |
| 2013/0218949 A1 | 8/2013 | Jakobson |
| 2013/0218966 A1 | 8/2013 | Jakobson |
| 2014/0359537 A1 | 12/2014 | Jackobson et al. |
| 2015/0006289 A1 | 1/2015 | Jakobson et al. |
| 2015/0007050 A1 | 1/2015 | Jakobson et al. |

OTHER PUBLICATIONS

Office Action in U.S. Appl. No. 13/802,338 mailed Dec. 7, 2015, 20 pages.
Office Action in U.S. Appl. No. 13/802,367 mailed Nov. 9, 2015, 20 pages.

* cited by examiner

Inbound Email email2x with Apex Code

When enabling the inbound email capabilities there is a number of security controls that can be implemented

| | |
|---|---|
| Verify SPF | ✓ Verify Sender Policy Framework (SPF) |
| TLS Only | ✓ Only accept emails delivered with TLS |
| Enabled | ✓ |

[Edit]

[Edit] [Add]

Apex Methods                                       Apex Methods Help

| Action | Name | API Version | From Email Address Check | No. of Users | Modified By |
|---|---|---|---|---|---|
| Remove | CreateContact | 9 | ✓ | 17 | Rasmus Mencke, 1/6/2007 10:09 AM |
| Remove | CreateLead | 10 | ✓ | 15 | Rasmus Mencke, 1/6/2007 10:09 AM |
| Remove | Email2case | 9 | ✓ | 37 | Rasmus Mencke, 1/6/2007 10:09 AM |
| Remove | Email2order | 10 | | 3 | Rasmus Mencke, 1/6/2007 10:09 AM |

Salesforcesfa

Home | | | | | | | Appexchange | Sales

Inbound Email email2x with Apex Code

Help for this Page ?

When enabling the inbound email capabilities there is a number of security controls that can be implemented

[ Save ] [ Cancel ]

Verify SPF ☑ Verify Sender Policy Framework (SPF)
TLS Only ☑ Only accept emails delivered with TLS

Enable ☑ By activating email2x (Inbound Emails) you allow users of your org to send and receive emails within Salesforce.com; emails will be processed by Apex code.

[ Save ] [ Cancel ]

FIGURE 2D

FIGURE 3B salesforcesfa

Home | Appexchange | Sales

Inbound Email email2x with Apex Code

Help for this Page ?

When enabling the inbound email capabilities there is a number of security controls that can be implemented Save   Cancel Email Methods    CreateLead ▼
Method Label     test
Email Address    test@oKJBRaTdUr3hCpUzsFG9aJHfB20Atw3O2DQdJcVrF66F9iAxkx5vMg7ZZvfTLWQ.in.salesforce.com   See Email Addresses   You need to save the email address before it works Save   Cancel

FIGURE 3C

SYSTEM, METHOD AND COMPUTER PROGRAM PRODUCT FOR MESSAGING IN AN ON-DEMAND DATABASE SERVICE

CLAIM OF PRIORITY

This application is a continuation of U.S. application Ser. No. 12/175,082, filed Jul. 17, 2008, which claims the benefit of U.S. Provisional Patent Application No. 60/950,831, filed Jul. 19, 2007, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to database systems, and more particularly to messaging in database systems.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request.

There is often a desire to message in the context of such database systems. For example, a user of the database system may not have access to the Internet for messaging. Thus, an alternative mechanism for messaging would be useful to the user.

BRIEF SUMMARY

In accordance with embodiments, there are provided mechanisms and methods for messaging in an on-demand database service. These mechanisms and methods for messaging in an on-demand database service can enable embodiments to more flexibly message in on-demand database environments. The ability of embodiments to provide such feature may lead to enhanced messaging features which may be used for providing more effective ways of messaging in the context of on-demand databases.

In an embodiment and by way of example, a method is provided for messaging in an on-demand database service. In use, a message is received using an on-demand database service, on behalf of an entity. Additionally, a security criterion retrieved from a portion of an on-demand database limited to information of the entity is applied. Furthermore, a rule for processing the message if the message successfully meets the security criterion is retrieved.

While the present invention is described with reference to an embodiment in which techniques for messaging in an on-demand database service are implemented in an application server providing a front end for a multi-tenant database on-demand service, the present invention is not limited to multi-tenant databases or deployment on application servers. Embodiments may be practiced using other database architectures, i.e., ORACLE®, DB2® and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

FIG. 2B shows a splash page that may be displayed to an administrator, in accordance with one embodiment.

FIG. 2C shows an interface for establishing rules and security criteria for messages associated with an entity, in accordance with one embodiment.

FIG. 2D shows an interface for verifying security criteria used for messaging, in accordance with one embodiment.

FIG. 3B shows an interface for generating an inbound email address, in accordance with one embodiment.

FIG. 3C shows an interface allowing a user to select rules implement, in accordance with one embodiment.

DETAILED DESCRIPTION

General Overview

Systems and methods are provided for messaging in an on-demand database service.

There is often a desire to message when using on-demand database systems. For example, a user of the database system may not have access to the internet for messaging. Thus, mechanisms and methods provided herein for messaging in an on-demand database service can enable embodiments to more flexibly message. The ability of embodiments to provide such feature may lead to enhanced messaging features which may be used for providing more effective ways of messaging in the context of on-demand databases.

Next, mechanisms and methods for messaging in an on-demand database service will be described with reference to exemplary embodiments.

Figure 1:
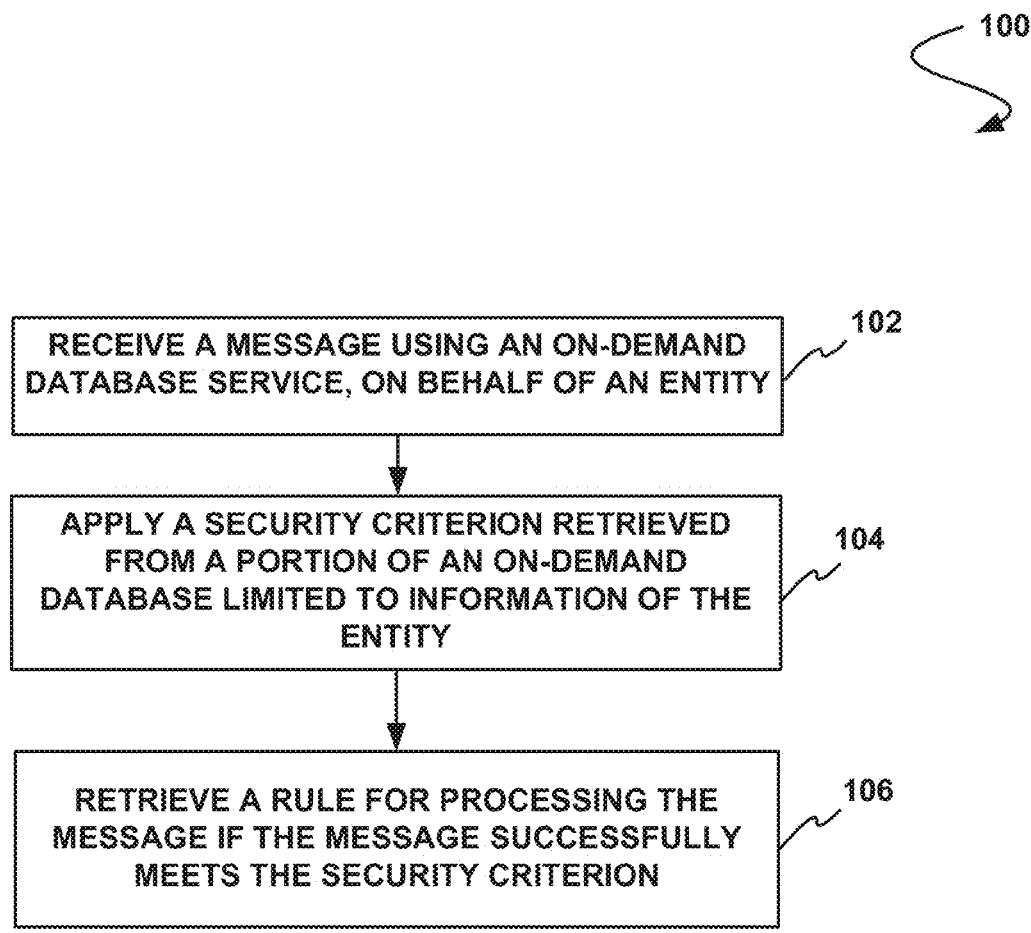
FIG. 1 shows a method for messaging in an on-demand database service, in accordance with one embodiment.

FIG. 1 shows a method 100 for messaging in an on-demand database service, in accordance with one embodiment. As shown, a message is received at an on-demand database service, on behalf of an entity. See operation 102.

In the context of the present description, an on-demand database service may include any service that relies on a database system that is accessible over a network. In one embodiment, the on-demand database service may include a multi-tenant on-demand database service. In the present description, such multi-tenant on-demand database service may include any service that relies on a database system that is accessible over a network, in which various elements of hardware and software of the database system may be shared by one or more customers. For instance, a given application server may simultaneously process requests for a great number of customers, and a given database table may store rows for a potentially much greater number of customers.

Furthermore, in the context of the present description, an entity refers to any individual, company, or organization, etc. Additionally, the message may be any type of electronic message. For example, in various embodiments, the message may include a workflow approval, a mass email, a single email, a notification, a case email, a billing email, a workflow request, an email to create a new case, a thread to a previous email, an inquiry, and a customer support email, etc.

In one embodiment, the message may be sent from the entity. Further, the message may be received at the on-demand database service or by an entity or database via the on-demand database service.

With further reference to FIG. 1, a security criterion retrieved from a portion of an on-demand database limited to information of the entity is applied. See operation 104. For example, the security criterion may be retrieved from a specific instance of the on-demand database of an on-demand database service provider, the instance being associated with the entity.

The security criterion may include any type of security criterion. For example, in various embodiments, the security criterion may include a sender policy framework (SPF) validation, a sender address validation, a transport layer security (TLS) authentication, anti-virus verification, anti-spam verification, etc.

In one embodiment, the security criterion may be managed by the on-demand database service controlling the on-demand database. Furthermore, a rule for processing the message if the message successfully meets the security criterion is retrieved. See operation 106. As an option, the retrieving may include retrieving the rule on behalf of the entity. For example, the entity may have defined the rule for processing the message.

In this case, the rule may include any rule or set of rules for processing the message. For example, in one embodiment, the rule may include creating a lead in the portion of the on-demand database based upon information contained in the message. In this case, the lead may include a customer lead.

In another embodiment, the rule may include sending the message to a case stored in the portion of the on-demand database. For example, the message may be sent to a file associated with information contained in the message. In still another embodiment, the rule may include creating a contact in the portion of the on-demand database based upon information contained in the message. In yet another embodiment, the rule may include invoking a custom code to process the message.

In either case, the message may be processed by applying the retrieved rule. As an option, processing resources used to process the message may be limited by applying a rate limit to a resource count tracked on behalf of processing the message. As another option, the rule for processing the message may be installed from an application exchange platform. Of course, these are options that may or may not be implemented in various embodiments.

Figure 2A:
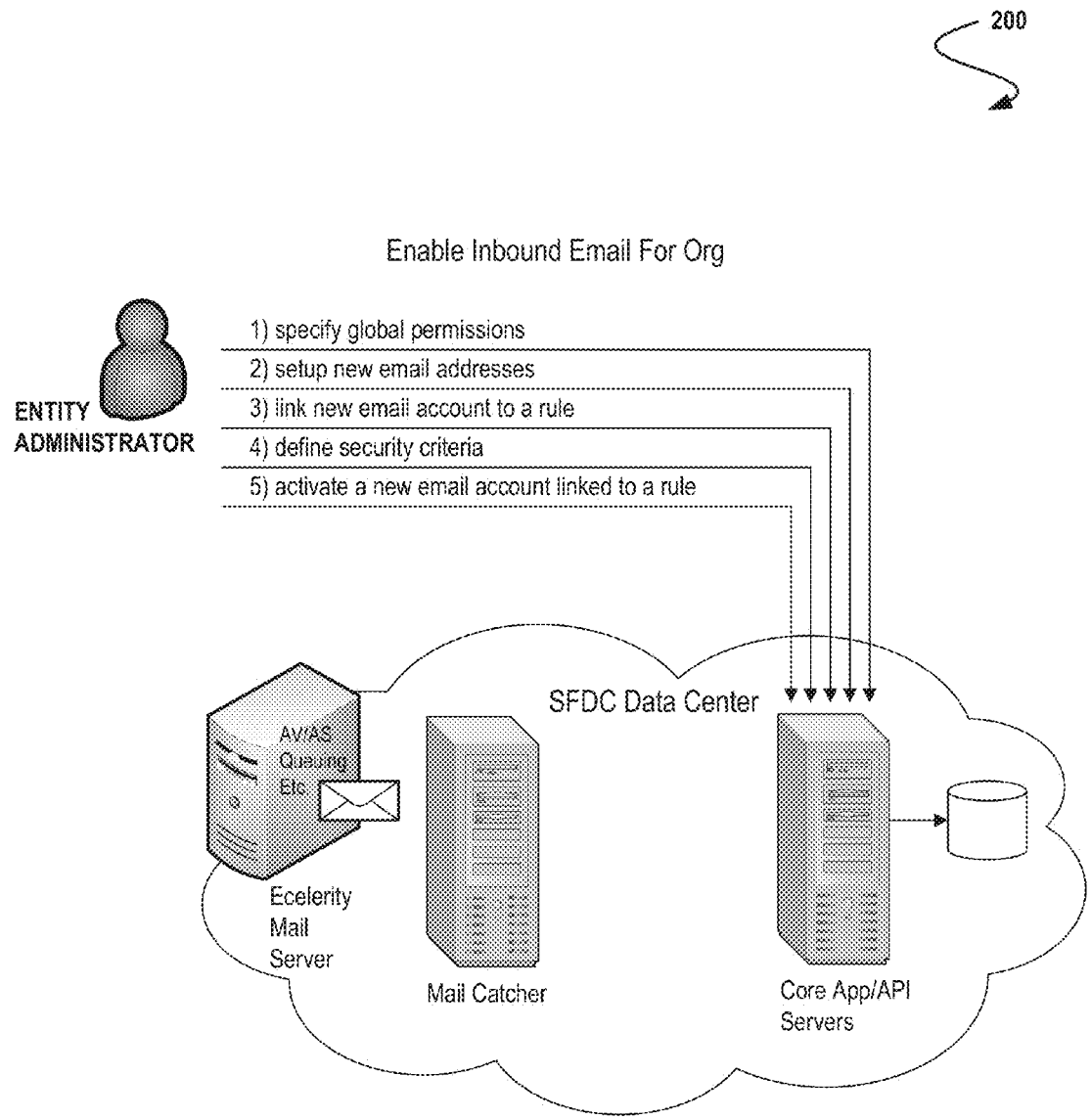
FIG. 2A shows a system for messaging in an on-demand database service, in accordance with another embodiment.

FIG. 2A shows a system 200 for messaging in an on-demand database service, in accordance with another embodiment. As an option, the present system 200 may be implemented in the context of the functionality of FIG. 1. Of course, however, the system 200 may be implemented in any desired environment. The aforementioned definitions may apply during the present description.

As shown, an administrator may have the ability to enable inbound messages for an entity. First, the administrator may specify global permissions required for inbound message processing. Next, the administrator may setup new email addresses and activate a new email account linked to a rule (e.g. defined in Apex Code) such that a unique email account is established that may be used to receive inbound emails. It should be noted that several different email addresses may be linked to the same rule.

In one embodiment, the administrator may access a setup interface for enabling the messaging capability of an organization and to choose what types of security/validation criteria to add to the inbound emails. For example, the administrator may implement security criteria such as SPF validation (e.g. limit to specific domains), sender address validation on a per rule basis, and TLS verification.

The administrator may also determine what rules may be available to users for creating unique email addresses. For example, the administrator may allow a user to have full control over rules and the code that can be applied and executed for processing messages.

Figure 2B:
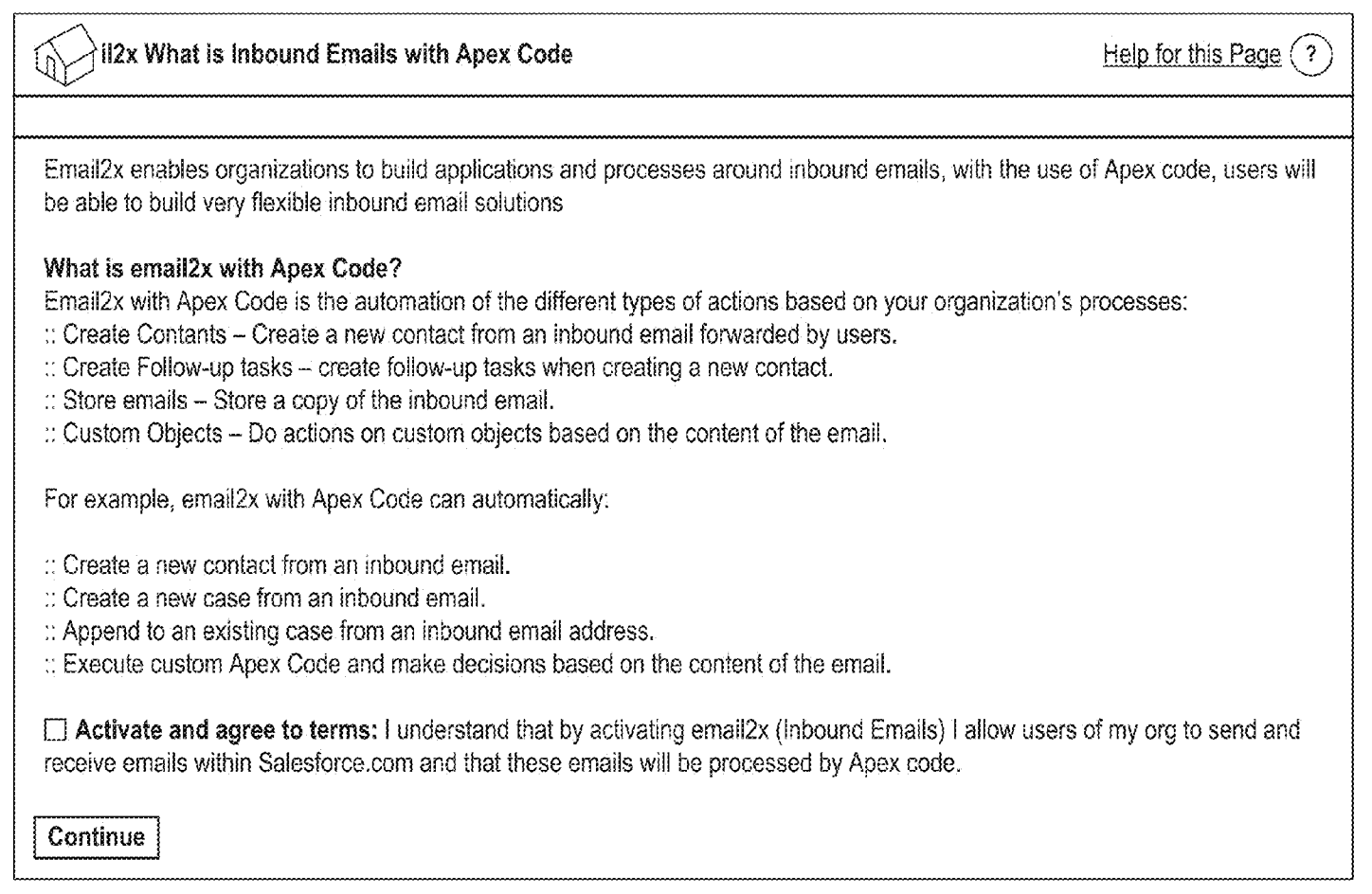

In one embodiment, the administrator may first be presented with a splash page, where the administrator may have to agree to enable a messaging feature to proceed. FIG. 2B shows a splash page that may be displayed to an administrator, in accordance with one embodiment.

Once the inbound message feature is enabled, the administrator may be able to define a set of inbound mail rules that may be supported by the entity (e.g. supported in an organization) and the security criteria to be enforced across the set of rules. This may cause an install of packages that support these functions from packages that an on-demand service provider has defined or from packages a customer/partner of the on-demand database service has created.

When enabling a rule for an inbound message, the administrator may also be able to choose whether the rule is only allowed to be invoked by a message from the senders initially established email address. FIG. 2C shows an interface for establishing rules and security criteria for messages associated with an entity, in accordance with one embodiment. Using this interface, the administrator may view all active rules, versions of application interfaces being used, the number of entities using email addresses linked to the rule, and the security criteria enabled.

Additionally, the administrator may edit the settings for the entity. For example, the administrator may edit whether the entity uses SPF and/or TLS validation for inbound messages or whether to disable the feature completely. FIG. 2D shows an interface for verifying security criteria used for messaging, in accordance with one embodiment.

Figure 3A:
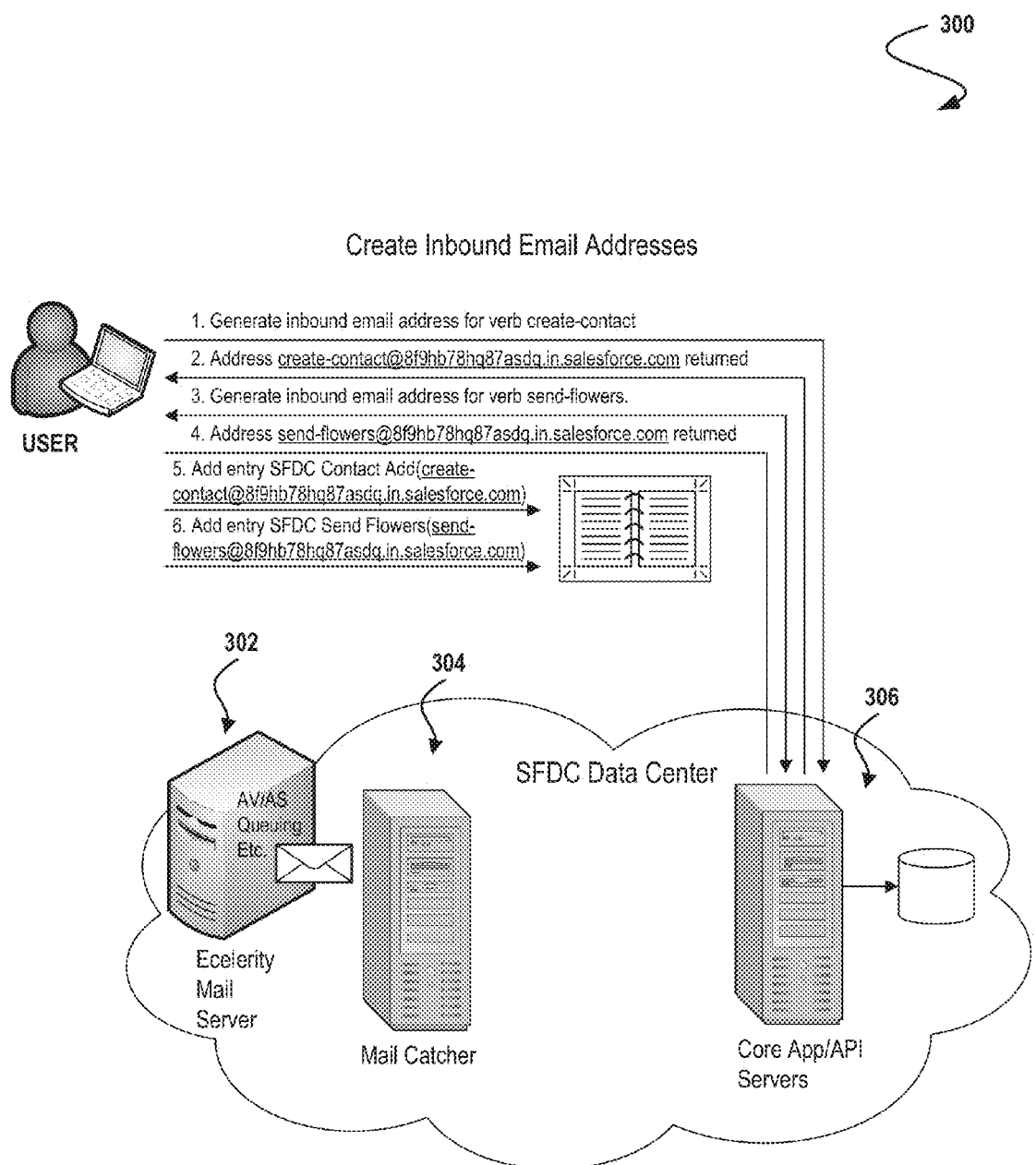
FIG. 3A shows a system for messaging in an on-demand database service, in accordance with another embodiment.

FIG. 3A shows a system 300 for messaging in an on-demand database service, in accordance with another embodiment. As an option, the present system 300 may be implemented in the context of the functionality of FIGS. 1-2. Of course, however, the system 300 may be implemented in any desired environment. Again, the aforementioned definitions may apply during the present description.

As shown, a user may generate an inbound email address. In one embodiment, the user may be presented with an overview of email addresses already enabled. If there are no email addresses, the user may have the option to create a new email address.

Figure 3B:
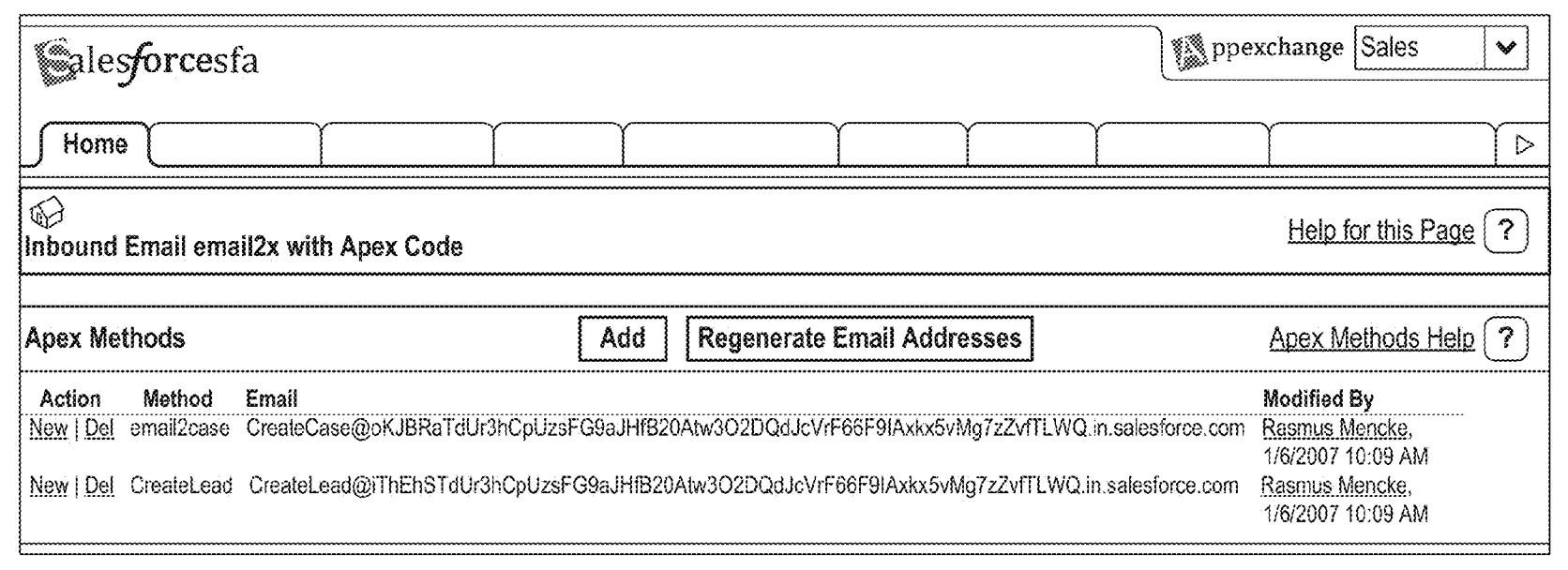

In this way, users may be able to select from a list of rules and email addresses that the administrator may have enabled. The users may select to use the default rule name or provide a customized local name for the new email address and/or rule. FIG. 3B shows an interface for generating an inbound email address, in accordance with one embodiment. FIG. 3C shows an interface allowing a user to select rules to implement, in accordance with one embodiment.

In one embodiment, a domain portion of the created address may be of the format seemingly-random-string.in. salesforce.com. As an option, the seemingly-random-string may be a Base64 encoded string including only numbers and letters. This may be accomplished by encrypting a sequence of 4 random characters used to identify the active user alias for this function, a 12 digit entity ID, a 12 digit user ID, a static qualifier of "in" to represent a generic inbound service email, and a static top level email domain representing a domain of the on-demand service provider.

Utilizing such a technique, an address that is difficult for spammers to randomly target may be generated. Moreover, since this may not be a general inbox for on-demand database users, users may not be passing this address out to others for general use. Typically, the user may forward or copy an email to this address via an address book alias entry or, in some cases, an email may be automatically forwarded to the address from another mail system. The user may have the ability to regenerate a user-specific domain if the user believes that the existing domain has been compromised (e.g. targeted by a spammer).

With further reference to FIG. 3A, mail may be received by a first mail server 302 and may be forwarded to a second mail server 304 for processing. In one embodiment, the first mail server 302 may add headers showing the success or failure of the security checks such as TLS verification, SPF verification, anti-virus email gateway filter checking, and anti-SPAM email gateway filter checking. The second mail server 304 may use information that it obtains to determine what actions to take based on the headers.

As an option, there may be rate limiting of email flow between the first mail server 302 and the second mail server 304. In this case, rate limiting at the entity level for inbound email may be considered.

Figure 4:
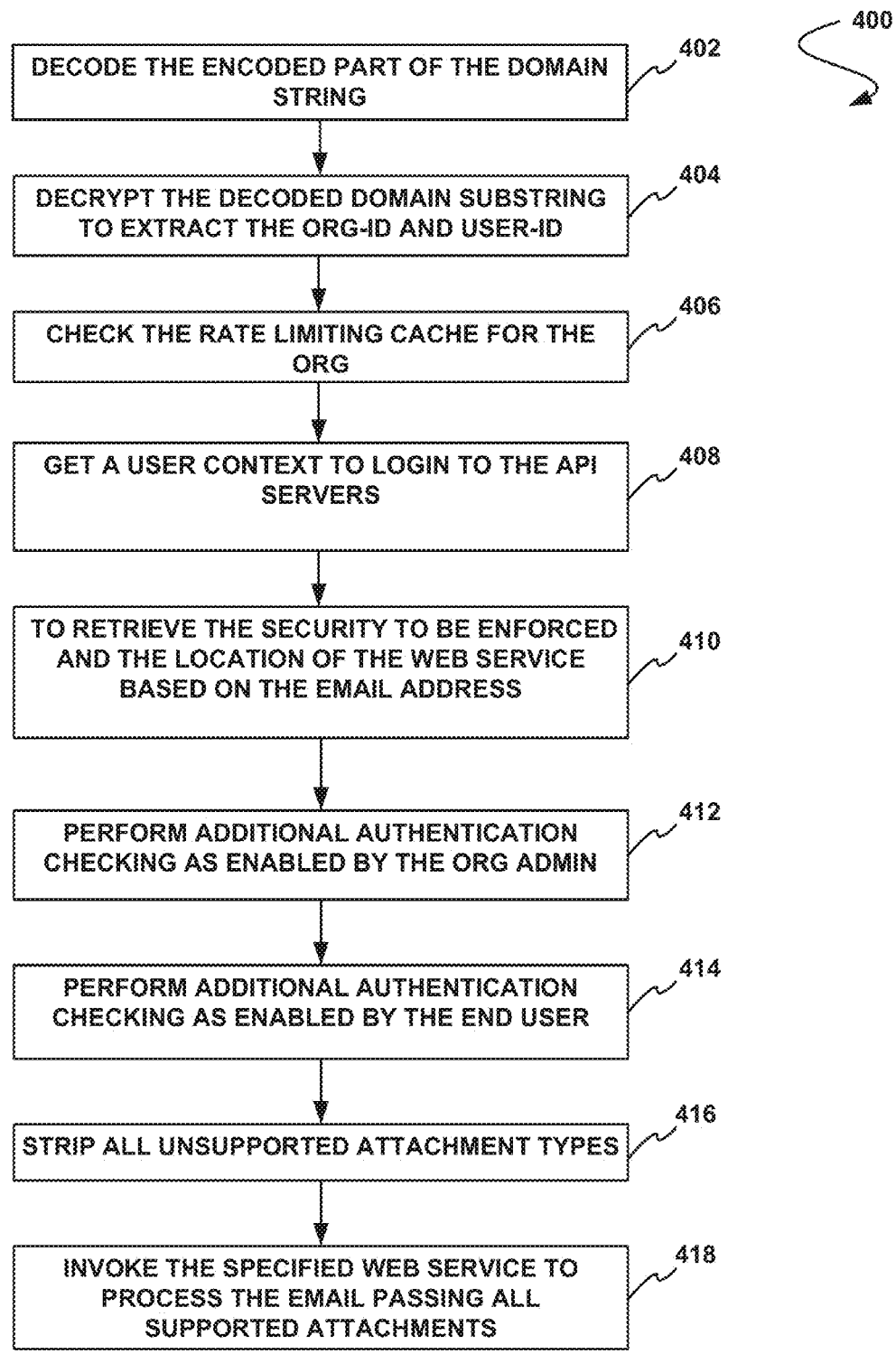
FIG. 4 shows a method for processing an inbound message, in accordance with one embodiment.

In one embodiment, the on-demand database provider may implement a new rate limiting that is different than daily limits that are configured by an entity. In this case, there may be a private interface to update the count for an entity return and the current daily aggregate for the entity. The second mail server 304 may cache these counts until it reaches some configurable limit. The second mail server 304 may then transmit the update in addition to updating the cache information with the aggregate returned. I n one embodiment, the second mail server 304 may be responsible for receiving the inbound mail from the first mail server 302 and forwarding it on to be processed by application programming interface (API) servers 306 in the core. FIG. 4 shows a method 400 for processing an inbound message, in accordance with one embodiment. As an option, the present method 400 may be implemented in the context of the functionality of FIGS. 1-3. Of course, however, the method 400 may be carried out in any desired environment. Further, the aforementioned definitions may apply during the present description.

As shown, the encoded part of the domain string in a received email is decoded. See operation 402. If the decoding is unsuccessful, the email is discarded and the process is exited. The decoded domain substring is then decrypted to extract an entity or organization ID and a user ID. See operation 404. If the decrypting is unsuccessful, the email is discarded and the process is exited.

The rate limiting cache for the entity is then examined. See operation 406. If the examination is unsuccessful, the email is discarded and the process is exited. A user context is then retrieved to login to the API servers (e.g. the API servers 306 of FIG. 3A). See operation 408. If the retrieving is unsuccessful, the email is discarded and the process is exited.

The security criteria to be enforced and the location of the web service based on the email address are retrieved. See operation 410. If the retrieving is unsuccessful, the email is discarded and the process is exited.

Additional authentication checking is then performed, as enabled by an entity administrator. See operation 412. For example, if an anti-spam check is required, which may optionally be automatically enforced for all users, the anti-spam check is performed. If an anti-spam flag has been set by the gateway, the email may be discarded and the process may be exited.

As another example, if an anti-virus check is required, which may optionally be automatically enforced for all users, the anti-virus check is performed. If an anti-virus flag has been set by the gateway, the email may be discarded and the process may be exited.

Additionally, if TLS or SPF validation is required, the TLS and/or the SPF validation may be performed. If either the TLS and/or the SPF verification fails, the email may be discarded and the process may be exited.

Once the administrator defined authentication is performed, any additional authentication checking enabled by the end user is performed. See operation 414. All unsupported attachment types are then stripped. See operation 416. For example, in one embodiment, the attachment types may be limited to VCard and iCal. Once the unsupported attachment types are stripped, the specified web service to process the email is invoked, passing all supported attachments. See operation 418.

System Overview

Figure 5:
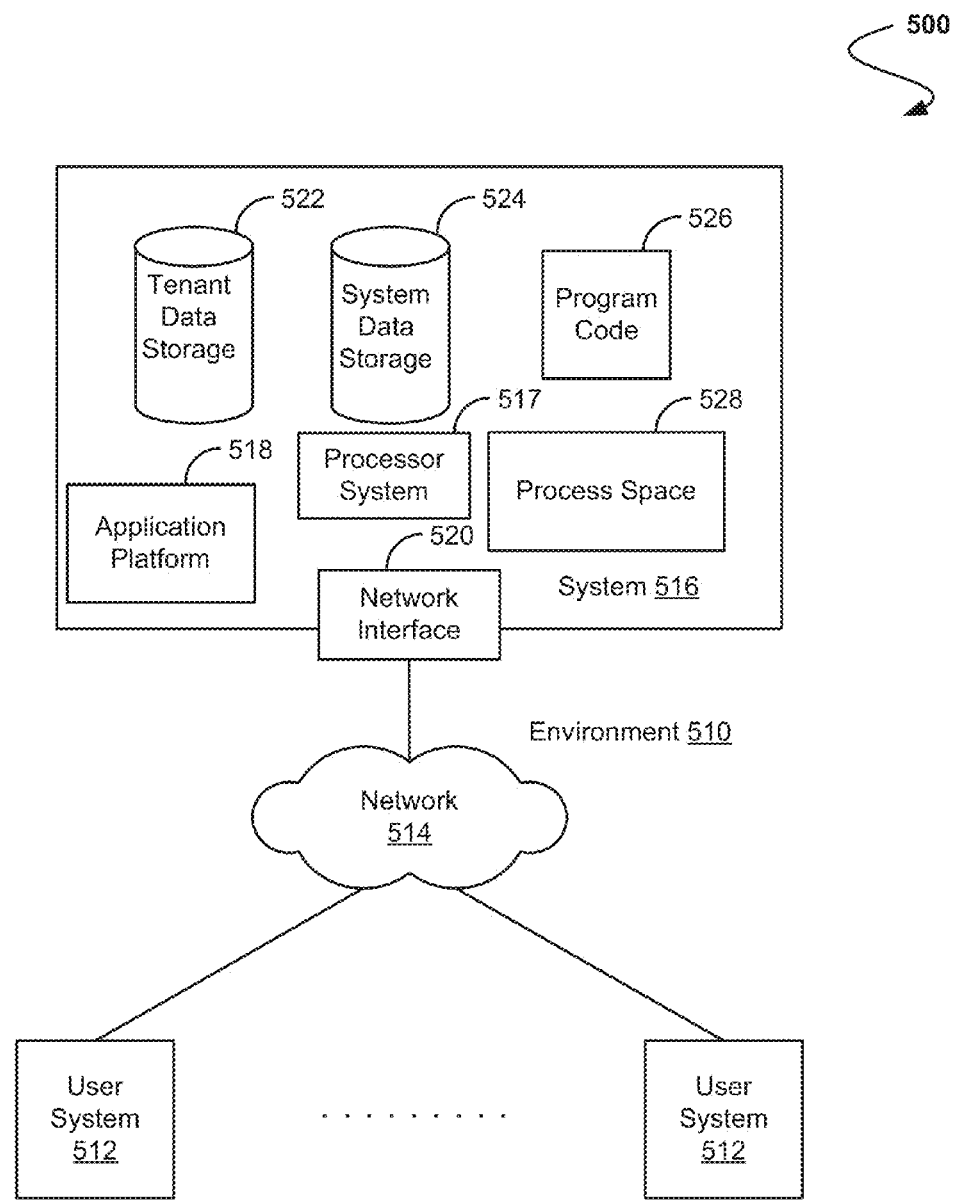
FIG. 5 illustrates a block diagram of an example of an environment wherein an on-demand database service might be used.

FIG. 5 illustrates a block diagram of an environment 510 wherein an on-demand database service might be used. As an option, any of the previously described embodiments of the foregoing figures may or may not be implemented in the context of the environment 510. Environment 510 may include user systems 512, network 514, system 516, processor system 517, application platform 518, network interface 520, tenant data storage 522, system data storage 524, program code 526, and process space 528. In other embodiments, environment 510 may not have all of the components listed and/or may have other elements instead of, or in addition to, those listed above.

Environment 510 is an environment in which an on-demand database service exists. User system 512 may be any machine or system that is used by a user to access a database user system. For example, any of user systems 512 can be a handheld computing device, a mobile phone, a laptop computer, a work station, and/or a network of computing devices. As illustrated in FIG. 5 (and in more detail in FIG. 6) user systems 512 might interact via a network with an on-demand database service, which is system 516.

An on-demand database service, such as system 516, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 516" and "system 516" will be used interchangeably herein. A database image may include one or more database objects. A relational database management system (RDMS) or the equivalent may execute storage and retrieval of information against the database object(s). Application platform 518 may be a framework that allows the applications of system 516 to run, such as the hardware and/or software, e.g., the operating system. In an embodiment, on-demand database service 516 may include an application platform 518 that enables creation, managing and executing one or more applications developed by the provider of the on-demand database service, users accessing the on-demand database service via user systems 512, or third party application developers accessing the on-demand database service via user systems 512.

The users of user systems 512 may differ in their respective capacities, and the capacity of a particular user system 512 might be entirely determined by permissions (permission levels) for the current user. For example, where a salesperson is using a particular user system 512 to interact with system 516, that user system has the capacities allotted to that salesperson. However, while an administrator is using that user system to interact with system 516, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 514 is any network or combination of networks of devices that communicate with one another. For example, network 514 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 512 might communicate with system 516 using TCP/IP and, at a higher network level, use other common Internet protocols to communicate, such as HTTP, FTP, AFS, WAP, etc. In an example where HTTP is used, user system 512 might include an HTTP client commonly referred to as a "browser" for sending and receiving HTTP messages to and from an HTTP server at system 516. Such an HTTP server might be implemented as the sole network interface between system 516 and network 514, but other techniques might be used as well or instead. In some implementations, the interface between system 516 and network 514 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 516, shown in FIG. 5, implements a web-based customer relationship management (CRM) system. For example, in one embodiment, system 516 includes application servers configured to implement and execute CRM software applications as well as provide related data, code, forms, webpages and other information to and from user systems 512 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 516 implements applications other than, or in addition to, a CRM application. For example, system 516 may provide tenant access to multiple hosted (standard and custom) applications, including a CRM application. User (or third party developer) applications, which may or may not include CRM, may be supported by the application platform 518, which manages creation, storage of the applications into one or more database objects and executing of the applications in a virtual machine in the process space of the system 516.

Figure 6:
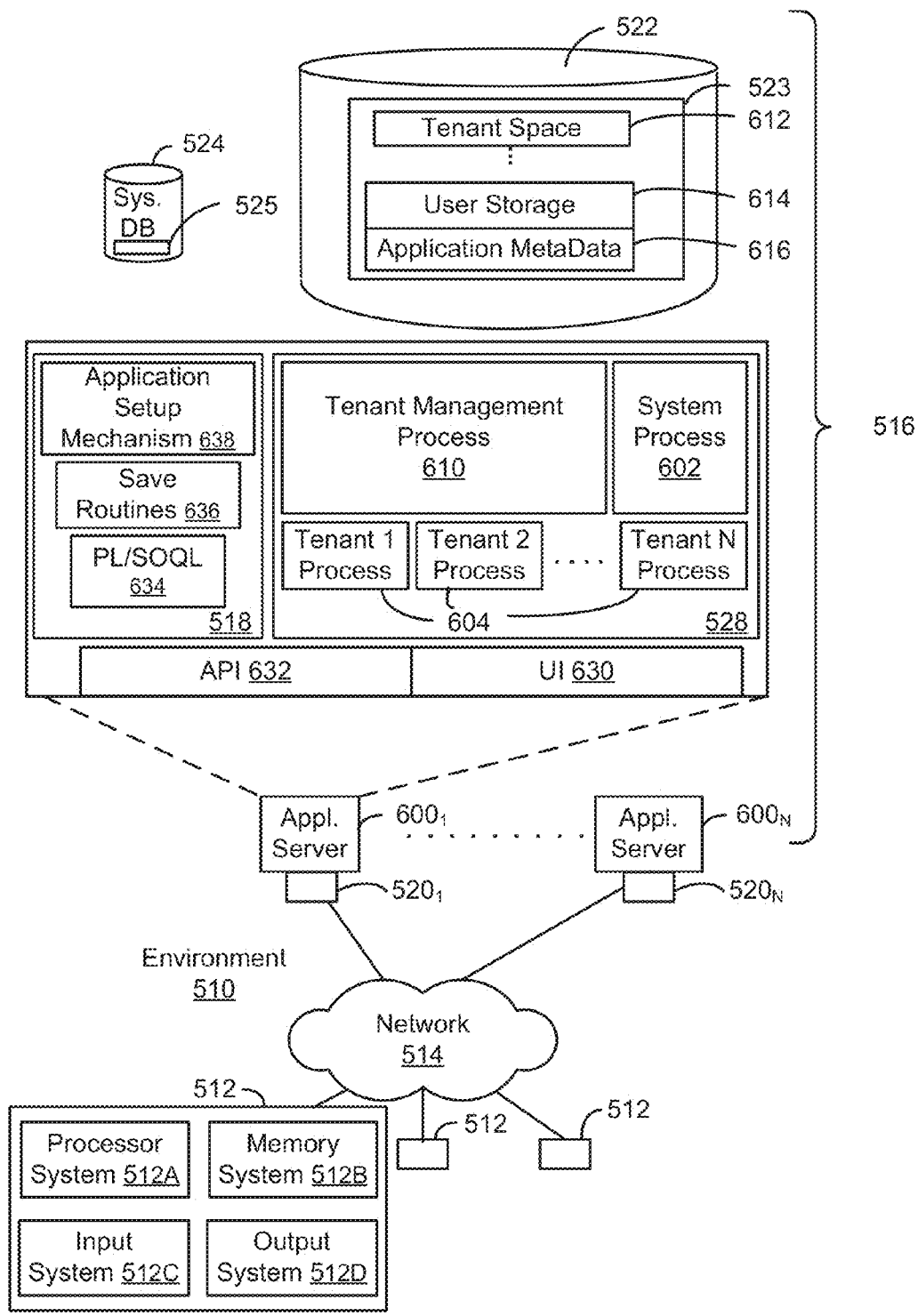
FIG. 6 illustrates a block diagram of an embodiment of elements of FIG. 5 and various possible interconnections between these elements.

One arrangement for elements of system 516 is shown in FIG. 6, including a network interface 520, application platform 518, tenant data storage 522 for tenant data 523, system data storage 524 for system data accessible to system 516 and possibly multiple tenants, program code for implementing various functions of system 516, and a process space 528 for executing MTS system processes and tenant-specific processes, such as running applications as part of an application hosting service. Additional processes that may execute on system 516 include database indexing processes.

Several elements in the system shown in FIG. 6 include conventional, well-known elements that are explained only briefly here. For example, each user system 512 could include a desktop personal computer, workstation, laptop, PDA, cell phone, or any wireless access protocol (WAP) enabled device or any other computing device capable of interfacing directly or indirectly to the Internet or other network connection. User system 512 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 512 to access, process and view information, pages and applications available to it from system 516 over network 514. Each user system 512 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 516 or other systems or servers. For example, the user interface device can be used to access data and applications hosted by system 516, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 512 and all of its components are operator configurable using applications, such as a browser, including computer code run using a central processing unit such as an Intel Pentium® processor or the like. Similarly, system 516 (and additional instances of an MTS, where more than one is present) and all of their components might be operator configurable using application(s) including computer code to run using a central processing unit such as processor system 517, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 516 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 516 is configured to provide webpages, forms, applications, data and media content to user (client) systems 512 to support the access by user systems 512 as tenants of system 516. As such, system 516 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 6 also illustrates environment 510. However, in FIG. 6 elements of system 516 and various interconnections in an embodiment are further illustrated. FIG. 6 shows that user system 512 may include processor system 512A, memory system 512B, input system 512C, and output system 512D. FIG. 6 shows network 514 and system 516. FIG. 6 also shows that system 516 may include tenant data storage 522, tenant data 523, system data storage 524, system data 525, User Interface (UI) 530, Application Program Interface (API) 632, PL/SOQL 634, save routines 636, application setup mechanism 638, applications servers $600_1$-$600_N$, system process space 602, tenant process spaces 604, tenant management process space 610, tenant storage area 612, user storage 614, and application metadata 616. In other embodiments, environment 510 may not have the same elements as those listed above and/or may have other elements instead of, or in addition to, those listed above.

User system 512, network 514, system 516, tenant data storage 522, and system data storage 524 were discussed above in FIG. 5. Regarding user system 512, processor system 512A may be any combination of one or more processors. Memory system 512B may be any combination of one or more memory devices, short term, and/or long term memory. Input system 512C may be any combination of input devices, such as one or more keyboards, mice, trackballs, scanners, cameras, and/or interfaces to networks. Output system 512D may be any combination of output devices, such as one or more monitors, printers, and/or interfaces to networks. As shown by FIG. 6, system 516 may include a network interface 520 (of FIG. 5) implemented as a set of HTTP application servers 600, an application platform 518, tenant data storage 522, and system data storage 524. Also shown is system process space 602, including individual tenant process spaces 604 and a tenant management process space 610. Each application server 600 may be configured to tenant data storage 522 and the tenant data 523 therein, and system data storage 524 and the system data 525 therein to serve requests of user systems 512. The tenant data 523 might be divided into individual tenant storage areas 612, which can be either a physical arrangement and/or a logical arrangement of data. Within each tenant storage area 612, user storage 614 and application metadata 616 might be similarly allocated for each user. For example, a copy of a user's most recently used (MRU) items might be stored to user storage 614. Similarly, a copy of MRU items for an entire organization that is a tenant might be stored to tenant storage area 612. A UI 630 provides a user interface and an API 632 provides an application programmer interface to system 516 resident processes to users and/or developers at user systems 512. The tenant data and the system data may be stored in various databases, such as one or more Oracle™ databases.

Application platform 518 includes an application setup mechanism 638 that supports application developers' creation and management of applications, which may be saved as metadata into tenant data storage 522 by save routines 636 for execution by subscribers as one or more tenant process spaces 604 managed by tenant management process 610 for example. Invocations to such applications may be coded using PL/SOQL 634 that provides a programming language style interface extension to API 632. A detailed description of some PL/SOQL language embodiments is discussed in commonly owned U.S. Provisional Patent Application 60/828,192 entitled, "PROGRAMMING LANGUAGE METHOD AND SYSTEM FOR EXTENDING APIS TO EXECUTE IN CONJUNCTION WITH DATABASE APIS," by Craig Weissman, filed Oct. 4, 2006, which is incorporated in its entirety herein for all purposes. Invocations to applications may be detected by one or more system processes, which manage retrieving application metadata 616 for the subscriber making the invocation and executing the metadata as an application in a virtual machine.

Each application server 600 may be communicably coupled to database systems, e.g., having access to system data 525 and tenant data 523, via a different network connection. For example, one application server $600_1$ might be coupled via the network 514 (e.g., the Internet), another application server $600_{N-1}$ might be coupled via a direct network link, and another application server $600_N$ might be coupled by yet a different network connection. Transfer Control Protocol and Internet Protocol (TCP/IP) are typical protocols for communicating between application servers 600 and the database system. However, it will be apparent to one skilled in the art that other transport protocols may be used to optimize the system depending on the network interconnect used.

In certain embodiments, each application server 600 is configured to handle requests for any user associated with any organization that is a tenant. Because it is desirable to be able to add and remove application servers from the server pool at any time for any reason, there is preferably no server affinity for a user and/or organization to a specific application server 600. In one embodiment, therefore, an interface system implementing a load balancing function (e.g., F5 Big-IP load balancer) is communicably coupled between the application servers 600 and the user systems 512 to distribute requests to the application servers 600. In one embodiment, the load balancer uses a least connections algorithm to route user requests to the application servers 600. Other examples of load balancing algorithms, such as round robin and observed response time, also can be used. For example, in certain embodiments, three consecutive requests from the same user could hit three different application servers 600, and three requests from different users could hit the same application server 600. In this manner, system 516 is multi-tenant, wherein system 516 handles storage of, and access to, different objects, data and applications across disparate users and organizations.

As an example of storage, one tenant might be a company that employs a sales force where each salesperson uses system 516 to manage their sales process. Thus, a user might maintain contact data, leads data, customer follow-up data, performance data, goals and progress data, etc., all applicable to that user's personal sales process (e.g., in tenant data storage 522). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 516 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 516 might also maintain system level data usable by multiple tenants or other data. Such system level data might include industry reports, news, postings, and the like that are sharable among tenants.

In certain embodiments, user systems 512 (which may be client systems) communicate with application servers 600 to request and update system-level and tenant-level data from system 516 that may require sending one or more queries to tenant data storage 522 and/or system data storage 524. System 516 (e.g. an application server 600 in system 516) automatically generates one or more SQL statements (e.g. one or more SQL queries) that are designed to access the desired information. System data storage 524 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "CUSTOM ENTITIES AND FIELDS IN A MULTI-TENANT DATABASE SYSTEM," which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

It should be noted that any of the different embodiments described herein may or may not be equipped with any one or more of the features set forth in one or more of the following published applications: US2003/0233404, titled "OFFLINE SIMULATION OF ONLINE SESSION BETWEEN CLIENT AND SERVER," filed Nov. 4, 2002; US2004/0210909, titled "JAVA OBJECT CACHE SERVER FOR DATABASES," filed Apr. 17, 2003, now issued U.S. Pat. No. 7,209,929; US2005/0065925, titled "QUERY OPTIMIZATION IN A MULTI-TENANT DATABASE SYSTEM," filed Sep. 23, 2003; US2005/0223022, titled "CUSTOM ENTITIES AND FIELDS IN A MULTI-TENANT DATABASE SYSTEM," filed Apr. 2, 2004; US2005/0283478, titled "SOAP-BASED WEB SERVICES IN A MULTI-TENANT DATABASE SYSTEM," filed Jun. 16, 2004; and/or US2006/0206834, titled "SYSTEMS AND METHODS FOR IMPLEMENTING MULTI-APPLICATION TABS AND TAB SETS," filed Mar. 8, 2005; which are each incorporated herein by reference in their entirety for all purposes.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A non-transitory machine-readable medium carrying one or more sequences of instructions which, when executed by one or more processors, cause the one or more processors to carry out the steps of:
receiving, by an on-demand database service on behalf of an entity, a message, wherein the on-demand database service includes an on-demand database;
retrieving, by the on-demand database service from a portion of the on-demand database, one or more security criteria that include validating an address of a sender of the message, wherein the one or more security criteria are specified by the entity;
applying, by the on-demand database service on behalf of the entity, the one or more security criteria to the message; and
in response to the message meeting the one or more security criteria, retrieving, by the on-demand database service, a rule for processing the message, wherein the rule is identified for retrieval using the validated address of the sender of the message.

2. The non-transitory machine-readable medium of claim 1, wherein the receiving includes receiving the message from the entity.

3. The non-transitory machine-readable medium of claim 1, wherein the one or more security criteria includes a security criteria managed by the on-demand database service.

4. The non-transitory machine-readable medium of claim 1, wherein the retrieving the rule is performed on behalf of the entity.

5. The non-transitory machine-readable medium of claim 1, wherein the steps further comprise processing the message by applying the rule retrieved.

6. The non-transitory machine-readable medium of claim 1, wherein the steps further comprise installing the rule for processing the message from an application exchange platform.

7. The non-transitory machine-readable medium of claim 1, wherein the message is received at the on-demand database service.

8. The non-transitory machine-readable medium of claim 7, wherein the message includes at least one of a workflow approval, a mass email, a single email, a notification, a case email, a billing email, and a workflow request.

9. The non-transitory machine-readable medium of claim 1, wherein the message is received via the on-demand database service.

10. The non-transitory machine-readable medium of claim 1, wherein the on-demand database service is a multi-tenant on-demand database service.

11. The non-transitory machine-readable medium of claim 1, wherein the one or more security criteria further include at least one of a sender policy framework validation, a transport layer security authentication, an anti-virus verification of the message, or any combination thereof.

12. The non-transitory machine-readable medium of claim 1, wherein the one or more security criteria further include an anti-spam verification.

13. The non-transitory machine-readable medium of claim 1, wherein the rule is configured to only be invoked in response to the validation of the address of the sender of the message.

14. A method, comprising:
receiving, by an on-demand database service on behalf of an entity, a message, wherein the on-demand database service includes an on-demand database;
retrieving, by the on-demand database service from a portion of the on-demand database limited to information associated with the entity, one or more security criteria that include validating an address of a sender of the message, wherein the one or more security criteria are specified by the entity;
applying, by the on-demand database service on behalf of the entity, the one or more security criteria to the message; and
in response to the message meeting the one or more security criteria, retrieving, by the on-demand database service, a rule for processing the message, wherein the rule is identified for retrieval using the validated address of the sender of the message.

15. The method of claim 14, further comprising applying the rule to the message, comprising limiting one or more processing resources used to process the message based on a rate limit.

16. The method of claim 14, wherein validating the address of the sender comprises verifying an encoded string included in the address of the sender.

17. The method of claim 16, wherein the encoded string includes an entity identifier corresponding to the sender of the message.

18. An apparatus, comprising:
a processor; and
a memory that includes one or more stored sequences of instructions which, when executed by the processor, cause the processor to carry out the steps of:
receiving, by an on-demand database service on behalf of an entity, a message, wherein the on-demand database service includes an on-demand database;
retrieving, by the on-demand database service from a portion of the on-demand database limited to information associated with the entity, one or more security criteria that include validating an address of a sender of the message, wherein the one or more security criteria are specified by the entity;
applying, by the on-demand database service on behalf of the entity, the one or more security criteria to the message; and
in response to the message meeting the one or more security criteria, retrieving, by the on-demand database service, a rule for processing the message, wherein the rule is identified for retrieval using the validated address of the sender of the message.

19. The apparatus of claim 18, wherein at least one of the one or more security criteria is requested by the entity and at least one of the one or more security criteria is requested by an administrator of the on-demand database service.

20. The apparatus of claim 18, wherein the rule corresponds to multiple sender addresses.

* * * * *